United States Patent
Morimoto et al.

(10) Patent No.: US 7,872,438 B2
(45) Date of Patent: Jan. 18, 2011

(54) INITIAL POLE POSITION ESTIMATING APPARATUS AND METHOD FOR AC SYNCHRONOUS MOTOR

(75) Inventors: Shinya Morimoto, Kitakyushu (JP); Hyun-Soo Song, Kitakyushu (JP); Mamoru Takaki, Kitakyushu (JP); Kozo Ide, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 471 days.

(21) Appl. No.: 12/088,146

(22) PCT Filed: Sep. 8, 2006

(86) PCT No.: PCT/JP2006/317818

§ 371 (c)(1), (2), (4) Date: Mar. 26, 2008

(87) PCT Pub. No.: WO2007/034689

PCT Pub. Date: Mar. 29, 2007

(65) Prior Publication Data

US 2008/0309268 A1    Dec. 18, 2008

(30) Foreign Application Priority Data

Sep. 26, 2005   (JP) ............................. 2005-277705

(51) Int. Cl.
*H02P 1/46*  (2006.01)
(52) U.S. Cl. ...................... 318/700; 318/705; 318/717; 318/400.32; 318/560
(58) Field of Classification Search ................ 318/700, 318/400.01, 400.32, 701, 704, 705, 717, 318/720, 721, 254.1, 560
See application file for complete search history.

(56) References Cited

U.S. PATENT DOCUMENTS

| | | | | |
|---|---|---|---|---|
| 6,677,724 | B1* | 1/2004 | Kim et al. | 318/700 |
| 6,940,250 | B2* | 9/2005 | Nishimura et al. | 318/705 |
| 7,733,044 | B2* | 6/2010 | Nakamura et al. | 318/400.02 |
| 2004/0180606 | A1* | 9/2004 | Iwashita et al. | 451/5 |
| 2004/0232862 | A1* | 11/2004 | Wogari et al. | 318/254 |

FOREIGN PATENT DOCUMENTS

| | | |
|---|---|---|
| JP | 7-087779 A | 3/1995 |
| JP | 2001-157482 A | 6/2001 |
| JP | 2003-111477 A | 4/2003 |

* cited by examiner

*Primary Examiner*—Walter Benson
*Assistant Examiner*—Thai Dinh
(74) *Attorney, Agent, or Firm*—Sughrue Mion, PLLC

(57) ABSTRACT

The present invention provides an initial pole position estimating apparatus and method for an AC synchronous motor without using magnetic pole detector. The initial pole position estimating apparatus includes a thrust force or torque pattern generating portion for generating a thrust force or torque pattern, a pole position command generating portion for generating a pole position command, and a position detecting portion for detecting a position of the AC synchronous motor. The initial pole position estimating apparatus can estimate an initial pole position in a short time with high precision without depending on a fluctuation in a load. The initial pole position estimating apparatus further includes a pole position correcting portion (8) for correcting the pole position command and a thrust force or torque pattern correcting portion (9) for correcting the thrust force or torque pattern, and an initial pole position is estimated through a repetitive correction.

13 Claims, 8 Drawing Sheets

INITIAL POLE POSITION ESTIMATING APPARATUS AND METHOD FOR AC SYNCHRONOUS MOTOR

TECHNICAL FIELD

The present invention relates to an initial pole position estimating apparatus and method for an AC synchronous motor to estimate an initial pole position of the AC synchronous motor without using a magnetic pole detector (a pole sensor) in a permanent magnet type AC synchronous motor including a linear motor and a rotating machine

BACKGROUND ART

Conventionally, a pole position is detected using a magnetic pole detector and an AC synchronous motor is controlled based on the pole position thus detected. However, there is a problem in that a cost is increased and a reliability is reduced due to providing the magnetic pole detector. In particular, a magnetic pole detector corresponding to an operating range of a motor is required in a linear motor. For this reason, the problem is remarkable. In order to solve the problem, pole position estimating means is used for estimating an initial magnetic pole of an AC synchronous motor without using the magnetic pole detector.

A conventional initial pole position estimating apparatus for an AC synchronous motor selects a first or second cycle section in accordance with results of a speed gain control portion and mode section deciding means. The initial pole position estimating apparatus includes first torque calculating means when the first cycle section is selected, and second torque calculating means when the second cycle section is selected, and calculates an estimated pole position using torque data obtained by the first and second torque calculating means (e.g., see Patent Document 1 and Patent Document 2).

FIG. 8 is a diagram showing a conventional initial pole position estimating apparatus and method for an AC synchronous motor. In FIG. 8, 1301 denotes command speed pattern generating means, 1302 denotes mode section deciding means, 1303 denotes speed integration gain processing means, 1304 denotes a mode switch, 1101 denotes a first cycle section (a q-axis command current is a command torque and a d-axis command current is zero), 1102 denotes data acquiring speed section deciding means, 1103 denotes first command current calculating means, 1104 denotes first memory storing means, 1201 denotes a second cycle section (a q-axis command current is zero and a d-axis command current is a command torque), 1202 denotes data acquiring speed section deciding means, 1203 denotes second command current calculating means, and 1204 denotes second memory storing means.

An AC synchronous motor control device comprises speed control means for calculating a command torque (a command current) from a command speed, and current control means and a PWM power converting device, each of which serve to drive an AC synchronous motor in response to a command torque (a command current). The AC synchronous motor control device serves to calculate an estimated initial pole position using information of the first command torque data (the first command current data) and the second command torque data (the second command current data) through speed deviation calculating means for subtracting the detected speed from the command speed generated from the command speed pattern generating means 1301 to calculate a speed deviation; a speed gain control portion for multiplying the speed deviation by a speed gain, thereby calculating a command torque (a command current); the mode section deciding means 1302 for carrying out a processing of deciding the mode section (the first cycle section 1101 and the second cycle section 1201) from the command speed; the mode switch 1304 for carrying out switching into either the first cycle section 1101 or the second cycle section 1201 in accordance with a result obtained by the mode section deciding means 1302; the data acquiring speed section deciding means 1102 for deciding whether the command speed is in a data acquiring speed section or not when the first cycle section 1101 is selected; the first command torque calculating means (the first command current calculating means) 1103 for calculating first command torque data (first command current data) from the command torque (the command current) in the data acquiring speed section thus decided; the data acquiring speed section deciding means 1202 for deciding whether the command speed is in the data acquiring speed section or not when the second cycle section 1201 is selected; and the second command torque calculating means (the second command current calculating means) 1203 for calculating second command torque data (second command current data) from the command torque (the command current) in the data acquiring speed section thus decided.

Patent Document 1: JP-A-2001-157482 Publication (see Pages 9 to 13, FIG. 3)

Patent Document 2: JP-A-2003-111477 Publication (see Page 8, FIGS. 17 and 18)

DISCLOSURE OF THE INVENTION

Problems to be Solved

In the conventional initial pole position estimating apparatus and method for the AC synchronous motor, in which a speed control is carried out, there is a problem in that a runaway preventing function is required because of the generation of runaway when an initial pole position is different from a set position, resulting in an increase in an estimating time. Moreover, there is also a problem in that an estimation error is increased when a load condition such as a friction of a guide mechanism is varied.

The invention has been made in consideration of the above problems and has an object to provide an initial pole position estimating apparatus and method for an AC synchronous motor, which detects the fluctuation in the load during the estimation of the initial pole position to correct a thrust force or torque pattern based on the detection value.

Therefore, the initial pole position estimating apparatus and method can estimate an initial pole position with high precision in a short time without depending on a fluctuation in a load.

Means for Solving the Problems

In order to solve the above problems, the invention has the following structure.

A first aspect of the invention is directed to an initial magnetic pole estimating apparatus for an AC synchronous motor without using a magnetic pole detector, the initial magnetic pole estimating apparatus comprising: a thrust force or torque pattern generating portion for generating a thrust force or torque pattern; a pole position command generating portion for generating a pole position command; a position detecting portion for detecting a position of the AC synchronous motor; a pole position correcting portion for correcting the pole position command; and a thrust force or torque pattern correcting portion for correcting the thrust force or torque pattern, wherein the pole position command and the thrust force or torque pattern are corrected repetitively to estimate an initial pole position.

According to a second aspect of the invention, the pole position correcting portion according to the first aspect of the invention corrects the pole position command based on an error angle calculated in an error angle calculating portion.

According to a third aspect of the invention, the error angle calculating portion according to the second aspect of the invention calculates the error angle based on two detected positions stored respectively when the AC synchronous motor is operated in accordance with the two pole position commands for pole positions of ±45 degrees.

According to a fourth aspect of the invention, the thrust force or torque pattern correcting portion according to the first aspect of the invention corrects the thrust force or torque pattern based on a root-mean-square moving amount calculated in a root-mean-square moving amount calculating portion.

According to a fifth aspect of the invention, the root-mean-square moving amount calculating portion according to the fourth aspect of the invention calculates the root-mean-square moving amount based on two detected positions stored respectively when the AC synchronous motor is operated in accordance with the two pole position commands for pole positions of ±45 degrees.

According to a sixth aspect of the invention, an amplitude value of the thrust force or torque pattern or a correction value of a command time is calculated only when the root-mean-square moving amount is smaller than a root-mean-square position reference set value which is previously set, and then the thrust force or torque pattern is corrected.

According to a seventh aspect of the invention, the correction of the thrust force or torque pattern in the thrust force or torque pattern correcting portion according to the first aspect of the invention is a correction of an amplitude value of the thrust force or torque pattern.

According to an eighth aspect of the invention, the correction of the thrust force or torque pattern in the thrust force or torque pattern correcting portion according to the first aspect of the invention is a correction of a command time of the thrust force or torque pattern.

According to a ninth aspect of the invention, the thrust force or torque pattern correcting portion according to the first or fourth aspect of the invention returns a current position to an initial magnetic pole estimation starting position based on a maximum value of the root-mean-square moving amount and the position detected in the position detecting portion.

A tenth aspect of the invention is directed to an initial magnetic pole estimating method for an AC synchronous motor without using a magnetic pole detector, the initial magnetic pole estimating method comprising: generating a thrust force or torque pattern; generating a pole position command; detecting a position of the AC synchronous motor; correcting the pole position command; and correcting the thrust force or torque pattern; and correcting the pole position command and the thrust force or torque pattern repetitively to estimate an initial pole position.

According to an eleventh aspect of the invention, the initial magnetic pole estimating method according to the tenth aspect of the invention further comprises: storing a position detected in accordance with the pole position command for a pole position of ±45 degrees; storing a position detected in accordance with the pole position command for a pole position of −45 degrees; calculating an error angle and a root-mean-square moving amount based on the two detected positions which are stored; correcting the pole position command based on the error angle; and correcting the thrust force or torque pattern based on the root-mean-square moving amount.

According to a twelfth aspect of the invention, the AC synchronous motor according to the first aspect of the invention is a rotating motor or a linear motor.

According to a thirteenth aspect of the invention, the thrust force or torque pattern generated by the thrust force or torque pattern generating portion according to the first aspect of the invention has an optional thrust force or torque pattern waveform.

ADVANTAGE OF THE INVENTION

According to the first aspect of the invention, it is possible to estimate the initial pole position without depending on a fluctuation in a load through an open loop control of a position in accordance with a thrust force or torque command. Moreover, it is possible to lessen a variation in estimating precision in the initial pole position for a mechanism system to be driven depending on an application and use.

According to the second to fifth aspects of the invention, it is possible to detect a load state during the estimation of the initial pole position, thereby regulating a thrust force or torque pattern. Moreover, it is possible to estimate the initial pole position in a short time with high precision and to enhance a reliability of a driving operation of the AC synchronous motor by using the initial pole position estimation value.

According to the sixth to eighth aspects of the invention, it is possible to select the initial pole position estimating method corresponding to the mechanism system to be driven depending on the application and use, thereby enhancing a general-purpose property.

According to the ninth aspect of the invention, it is possible to return the current position to the initial magnetic pole estimation starting position and to enhance a reproducibility of the estimation of the initial pole position, thereby carrying out the estimation with high precision.

According to the tenth or eleventh aspect of the invention, it is possible to estimate the initial pole position without depending on a fluctuation in a load through an open loop control of a position in accordance with a thrust force or torque command. Moreover, it is possible to lessen a variation in estimating precision in the initial pole position for a mechanism system to be driven depending on an application and use.

According to the twelfth aspect of the invention, it is possible to estimate the initial pole position without depending on a mechanism system to be driven based on an application and use.

According to the thirteenth aspect of the invention, it is possible to select a pattern corresponding to a mechanism system to be driven based on an application and use without fixing a pattern, thereby enhancing a general-purpose property.

Figure 1:
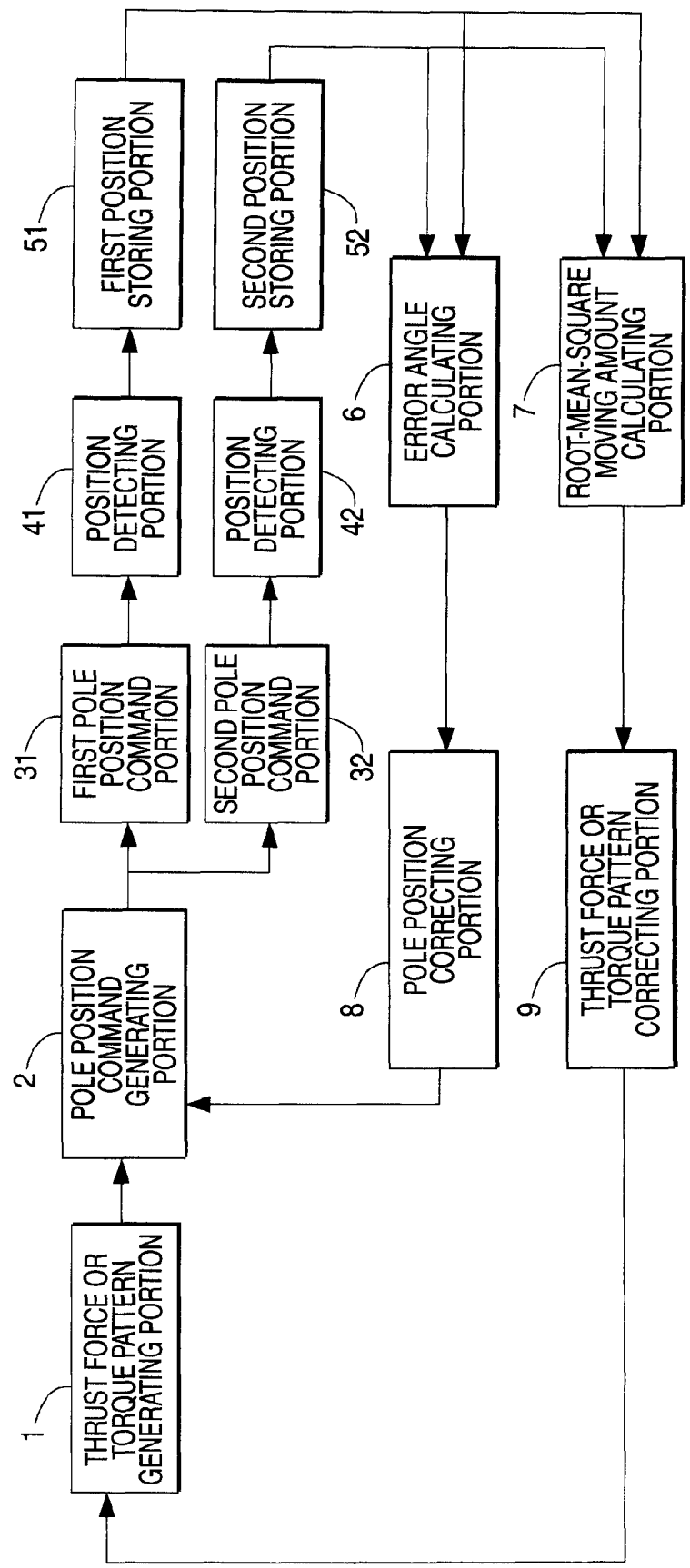
FIG. 1 is a schematic block diagram showing a structure of an initial pole position estimating apparatus and method according to the invention.

EXPLANATION OF THE DESIGNATIONS 1 thrust force or torque pattern generating portion
2 pole position command generating portion
31 first pole position command portion
32 second pole position command portion
41, 42 position detecting portion
51 first position storing portion
52 second position storing portion
6 error angle calculating portion
7 root-mean-square moving amount calculating portion
8 pole position correcting portion
9 thrust force or torque pattern correcting portion
101 pole position command ($\theta_{err}$+45°) applying step
102 thrust force or torque pattern generating portion step
103 position ($P_{+45}$) measuring step
104 position ($P_{+45}$) storing step
105 pole position command ($\theta_{err}$−45°) applying step
106 thrust force or torque pattern generating portion step
107 position ($P_{-45}$) measuring step
108 position ($P_{-45}$) storing step
109 pole position error $\theta_{err}$ calculating step
110 root-mean-square moving amount P calculating step
111 estimation frequency deciding step
112 moving amount deciding step
113 command thrust force or torque regulating step
201 pole position command ($\theta_{err}$+45°) applying step
202 thrust force or torque pattern generating portion step
203 position ($P_{+45}$) measuring step
204 position ($P_{+45}$) storing step
205 pole position command ($\theta_{err}$−45°) applying step
206 thrust force or torque pattern generating portion step
207 position ($P_{-45}$) measuring step
208 position ($P_{-45}$) storing step
209 pole position error $\theta_{err}$ calculating step
210 root-mean-square moving amount P calculating step
211 estimation frequency deciding step
212 moving amount deciding step
213 command time regulating step

BEST MODE FOR CARRYING OUT THE INVENTION

A specific example of a method according to the invention will be described below with reference to the drawings.

Example 1

FIG. 1 is a schematic block diagram showing a structure of an initial pole position estimating apparatus and method according to the invention. In FIG. 1, 1 denotes a thrust force or torque pattern generating portion, 2 denotes a pole position command generating portion, 31 denotes a first pole position command portion, 32 denotes a second pole position command portion, 41 and 42 denote a position detecting portion, 51 denotes a first position storing portion, 52 denotes a second position storing portion, 6 denotes an error angle calculating portion, 7 denotes a root-mean-square moving amount calculating portion, 8 denotes a pole position correcting portion, and 9 denotes a thrust force or torque pattern correcting portion.

A thrust force or torque pattern is generated in the thrust force or torque pattern generating portion 1, a pole position command is generated in the pole position command generating portion 2, a pole position command of (a pole position +45 degrees) is used to operate an AC synchronous motor in the first pole position command portion 31, a position of the AC synchronous motor is detected in the position detecting portion 41, and the position thus detected is stored in the first position storing portion 51. Moreover, a pole position command of (a pole position of −45 degrees) is used to operate the AC synchronous motor in the second pole position command portion 32, a position of the AC synchronous motor is detected in the position detecting portion 42, and the position thus detected is stored in the second position storing portion 52.

The invention is greatly different from the Patent Document 1 and the Patent Document 2 in that an initial pole position is not estimated through a speed control but an open loop control for a position in accordance with a thrust force or toque command, and furthermore, is different from them in that there is provided a component for correcting a pole position command and a thrust force or torque pattern to estimate the initial pole position.

An error angle is calculated in the error angle calculating portion 6 by using two positions stored in the first position storing portion 51 and the second position storing portion 52. The pole position command of the pole position command generating portion 2 is corrected by the pole position correcting portion 8. Moreover, a root-mean-square moving amount is calculated from the two positions stored in the first position storing portion 51 and the second position storing portion 52 through the root-mean-square moving amount calculating portion 7. A thrust force or torque amplitude correction value or a thrust force or torque command time correction value is calculated from the root-mean-square moving amount and a moving amount set value through the thrust force or torque pattern correcting portion 9, and the value thus calculated is added to a command thrust force or torque, or a command time, and the thrust force or torque pattern is thus regulated by applying to the thrust force or torque pattern generating portion 1.

Figure 4:
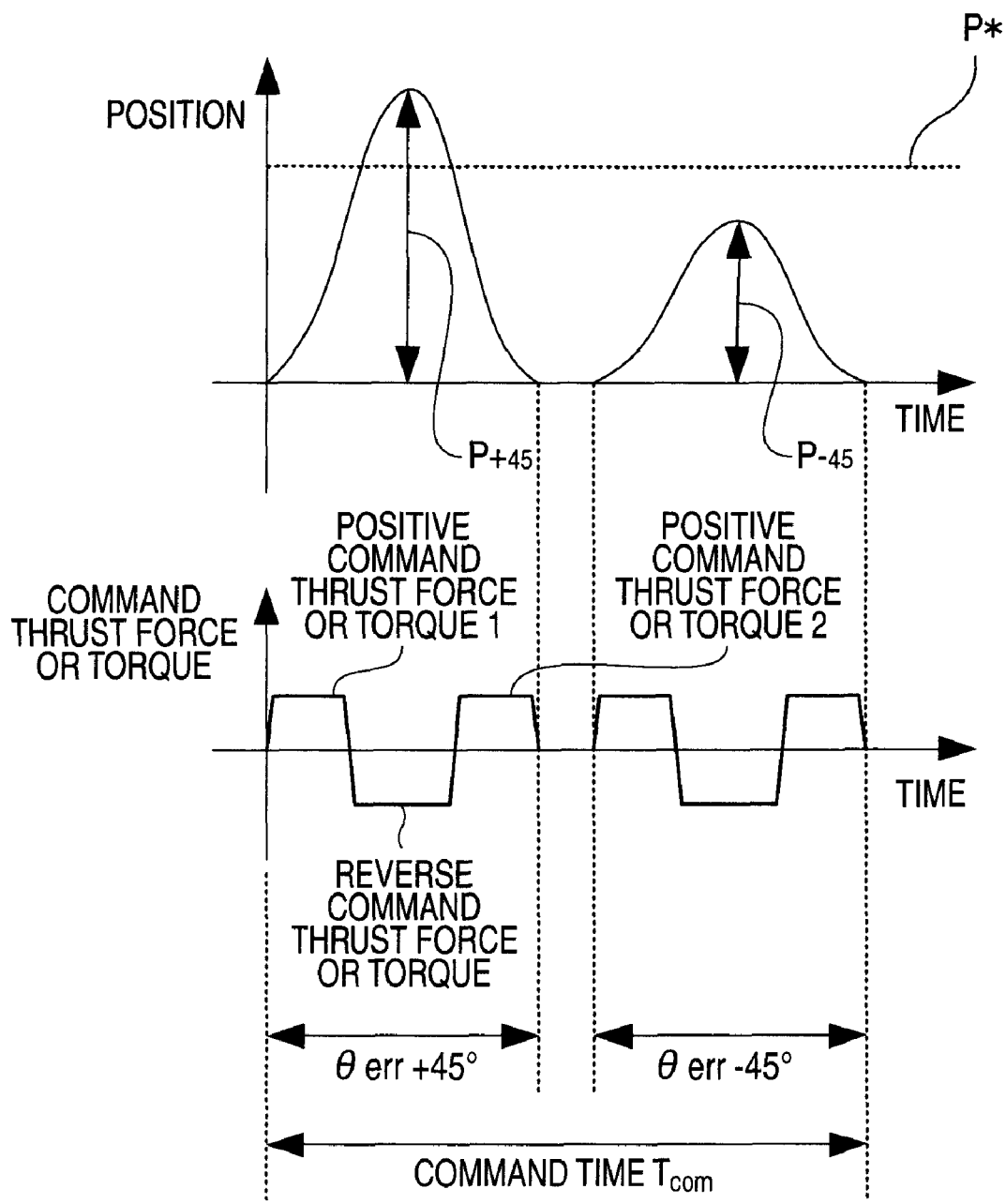
FIG. 4 is a chart showing a change in a position of an AC synchronous motor depending on a thrust force or torque pattern according to the invention.

FIG. 4 is a chart showing a change in a position of the AC synchronous motor depending on the thrust force or torque pattern according to the invention. The thrust force or torque pattern generated from the thrust force or torque pattern generating portion 1 is constituted by a positive command thrust force or torque 1, a reverse command thrust force or torque, and a positive command thrust force or torque 2. This is applied to the positions of +45 degrees and −45 degrees of the pole position command value so that the change in the position is shown in an upper stage of FIG. 4. The change in the position of (the pole position command value of +45 degrees) and the change in the position of (the pole position command value of −45 degrees) are equal to each other when the pole position command and an actual pole position are coincident with each other. Meanwhile, they are different from each other when the pole positions have an error.

When an error angle of the pole position is represented by $\theta_{err}$, the positions of +45 degrees and −45 degrees of the pole position command value are obtained from Equation (1) respectively using a position P* when the pole position command and the actual pole position are coincident with each other. Moreover, the error angle $\theta_{err}$ can be calculated using Equation (2).

$$P_{+45} = P^* \times \cos(\pi/4 + \theta_{err})$$
$$P_{-45} = P^* \times \cos(-\pi/4 + \theta_{err}) \tag{1}$$

$$\theta_{err} = \left\{ \tan^{-1}\left(\frac{P_{+45}}{P_{-45}}\right) - \frac{\pi}{4} \right\} \frac{180}{\pi} \tag{2}$$

Moreover, the root-mean-square of the positions of +45 degrees and −45 degrees of the pole position command value is equal to $\sqrt{2}$ times as great as the position P* when the pole position command and the actual pole position are coincident with each other. At this time, P* is calculated as the root-mean-square moving amount based on Equation (3).

$$\sqrt{P_{+45}^2 + P_{-45}^2} = \sqrt{2} P^* \tag{3}$$

Figure 5:
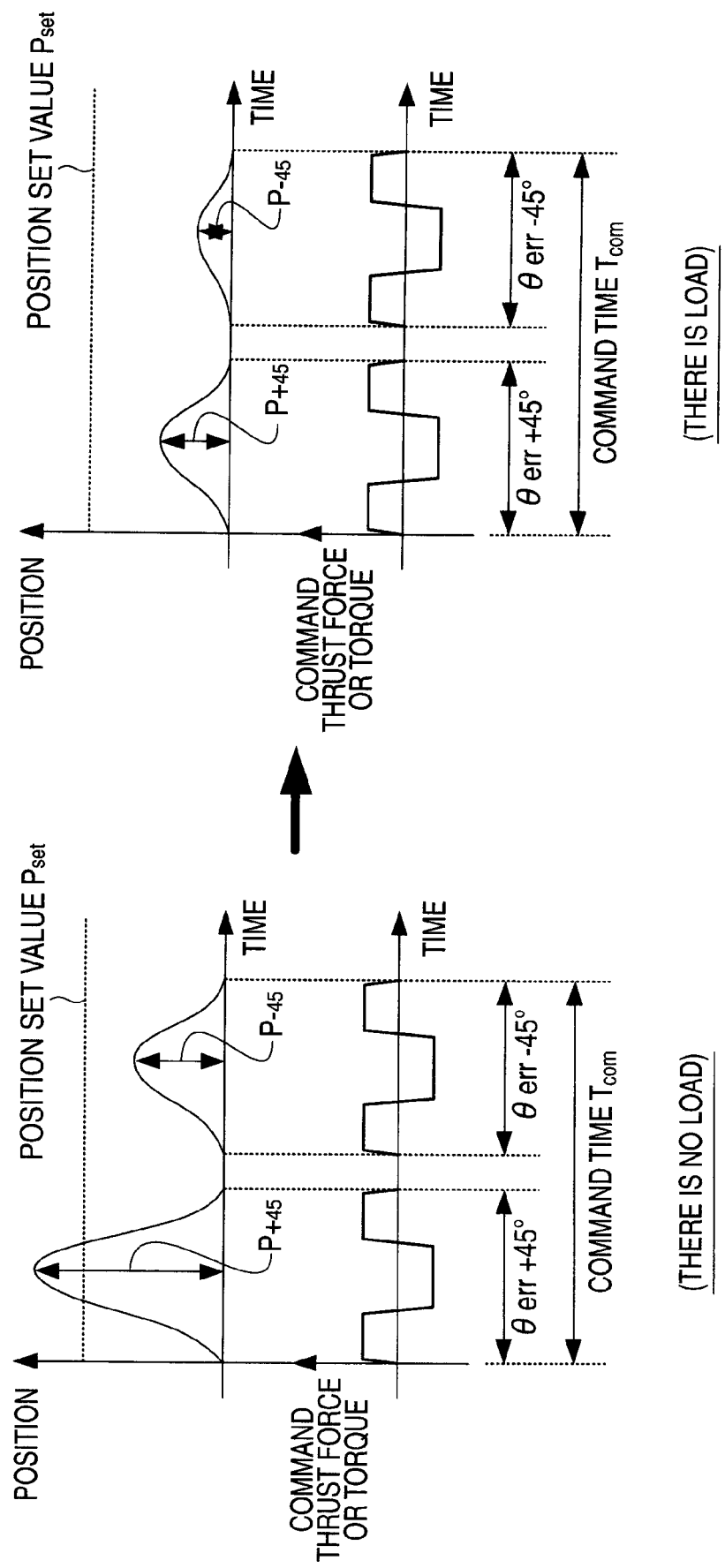
FIG. 5 is a chart showing an example in which the change in the position of the AC synchronous motor through the thrust force or torque pattern according to the invention is reduced with a load.

FIG. 5 is a chart showing an example in which the change in the position of the AC synchronous motor based on the thrust force or torque pattern according to the example is reduced in accordance with a load. In FIG. 5, it is indicated that positions ($P_{+45}$) and ($P_{-45}$) of the AC synchronous motor are varied depending on the presence of a load such as a friction of a guide mechanism when the thrust force or torque pattern is fixed to be constant and is thus applied to the AC synchronous motor. More specifically, when the load is present, the moving amount is decreased and precision in the estimation of the initial pole position is deteriorated in relation to a position detecting resolution.

Figure 2:
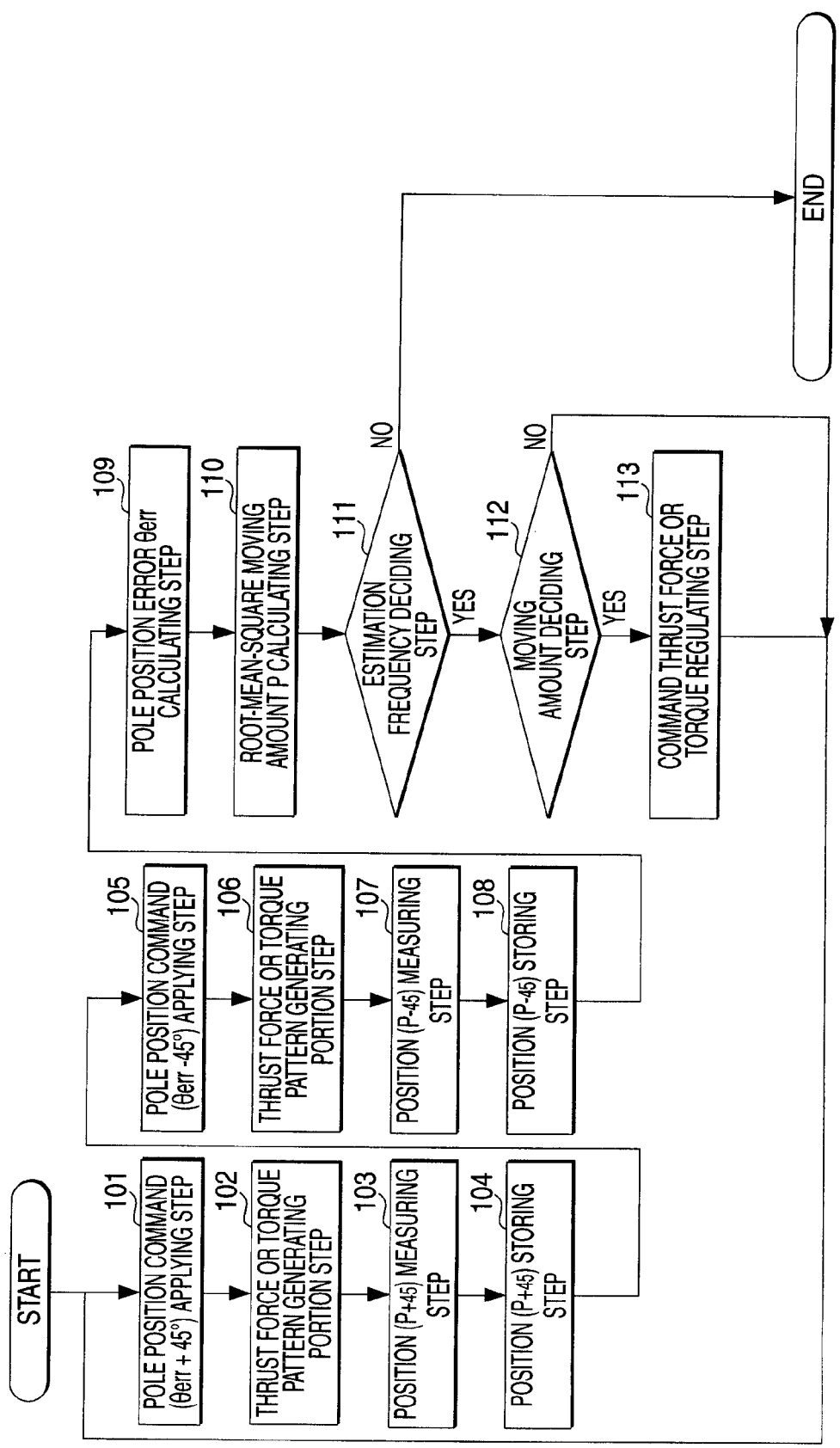
FIG. 2 is a flowchart showing an initial pole position estimating method according to an example 1 of the invention.

FIG. 2 is a flowchart showing the initial pole position estimating method according to the example 1 of the invention. In the drawing, it is indicated that a command thrust force or torque amplitude is regulated using two types of test angles ($\theta_{err}$+45°) and ($\theta_{err}$−45°) as a pole position command. In the drawing, 101 denotes a pole position command ($\theta_{err}$+45°) applying step, 102 and 106 denote a thrust force or torque pattern generating portion step, 103 denotes a position ($P_{+45}$) measuring step, 104 denotes a position ($P_{+45}$) storing step, 105 denotes a pole position command ($\theta_{err}$−45°) applying step, 107 denotes a position ($P_{-45}$) measuring step, 108 denotes a position ($P_{-45}$) storing step, 109 denotes a pole position error $\theta_{err}$ calculating step, 110 denotes a root-mean-square moving amount P calculating step, 111 denotes an estimation frequency deciding step, 112 denotes a moving amount deciding step, and 113 denotes a command thrust force or torque regulating step.

First of all, the pole position command ($\theta_{err}$+45°) is applied at the pole position command ($\theta_{err}$+45°) applying step 101. Then, a thrust force or torque pattern is generated using a command thrust force or torque and a command time at the thrust force or torque pattern generating portion step 102. A position ($P_{+45}$) is measured at the position ($P_{+45}$) measuring step 103, and then the position ($P_{+45}$) measured in the position storing device is stored at the position ($P_{+45}$) storing step 104.

Next, the pole position command ($\theta_{err}$−45°) is applied at the pole position command ($\theta_{err}$−45°) applying step 105, and then a thrust force or torque pattern is generated using the command thrust force or torque and the command time at the thrust force or torque pattern generating portion step 106. A position ($P_{-45}$) is measured at the position ($P_{-45}$) measuring step 107, and then the position ($P_{-45}$) measured in the position storing device is stored at the position ($P_{-45}$) storing step 108.

Then, a pole position error ($\theta_{err}$) is calculated using the position ($P_{+45}$) and the position ($P_{-45}$) stored in the position storing device at the pole position error $\theta_{err}$ calculating step 109. Then, a root-mean-square moving amount (P) is obtained at the root-mean-square moving amount P calculating step 110. Then, it is checked whether a first estimating calculation is carried out or not at the estimation frequency deciding step 111 and then a position ($P_{save}$) stored in the position storing device is compared with a position set value ($P_{set}$) at the moving amount deciding step 112 if the first estimating calculation is carried out. A thrust force or torque amplitude correction value $\tau_{cmp}$ is obtained and added to the command thrust force or torque $\tau_{com}$ to regulate the command thrust force or torque ($\tau_{com} = \tau_{com} + \tau_{cmp}$) at the command thrust force or torque regulating step 113 if the position ($P_{save}$) is smaller than the position set value ($P_{set}$). Then, the processing is repeated from the pole position command ($\theta_{err}$+45°) applying step 101 again. The position storing device indicates a memory such as the first position storing portion 51 and the second position storing portion 52 in FIG. 1, and the position ($P_{save}$) is the calculated root-mean-square moving amount (P) which is stored in the memory, and the position set value ($P_{set}$) represents a root-mean-square position reference set value which is set in advance.

The position ($P_{save}$) stored in the position storing device is compared with the position set value ($P_{set}$) at the moving amount deciding step 112. If the position ($P_{save}$) is not smaller than the position set value ($P_{set}$), the thrust force or torque pattern is not corrected but the processing is repeated from the pole position command ($\theta_{err}$+45°) applying step 101 again. More specifically, if an estimation frequency is equal to or greater than two at the estimation frequency deciding step 111, the processing is to be ended. At a first estimation, precision in the estimation of the error angle $\theta_{err}$ is not high. Therefore, the error angle $\theta_{err}$ and the moving amount P are regulated and the estimation is then repeated again to enhance the precision.

Figure 6:
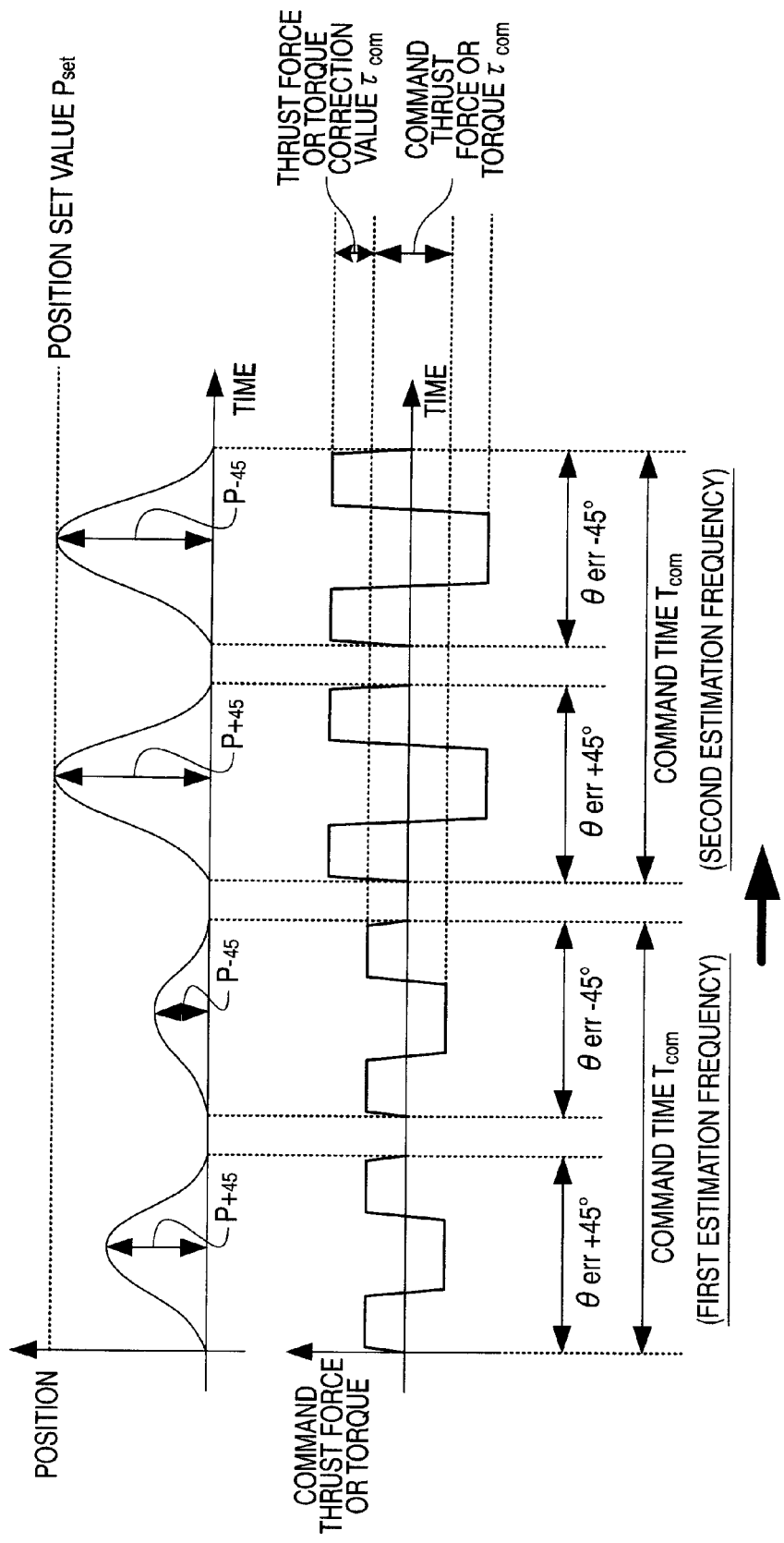
FIG. 6 is a chart showing a regulation of a thrust force or torque of a command according to the example 1 of the invention.

FIG. 6 is a chart showing the regulation of the command thrust force or torque according to the example 1 of the invention. In the drawing, it is indicated that the pole position is corrected after the first estimation frequency and the thrust force or torque correction value $\tau_{cmp}$ is added to the command thrust force or torque $\tau_{com}$ to regulate the thrust force or torque pattern and to apply the regulated thrust force or torque pattern to the AC synchronous motor and the positions ($P_{+45}$) and ($P_{-45}$) of the AC synchronous motor can be thus adapted to the position set value ($P_{set}$) irrespective of a load state such as a friction of a guide mechanism. More specifically, when the position ($P_{+45}$) or ($P_{-45}$) is smaller than the position set value ($P_{set}$), it is preferable to increase the thrust force or torque command and the thrust force or torque amplitude correction value $\tau_{cmp}$ is obtained from the command thrust force or torque $\tau_{com}$ of the command and Equation (4), and the command thrust force or torque $\tau_{com}$ of the command is thus corrected.

$$\tau_{cmp} = \frac{P_{set} - P}{P} \times \tau_{com} \tag{4}$$

Example 2

Figure 3:
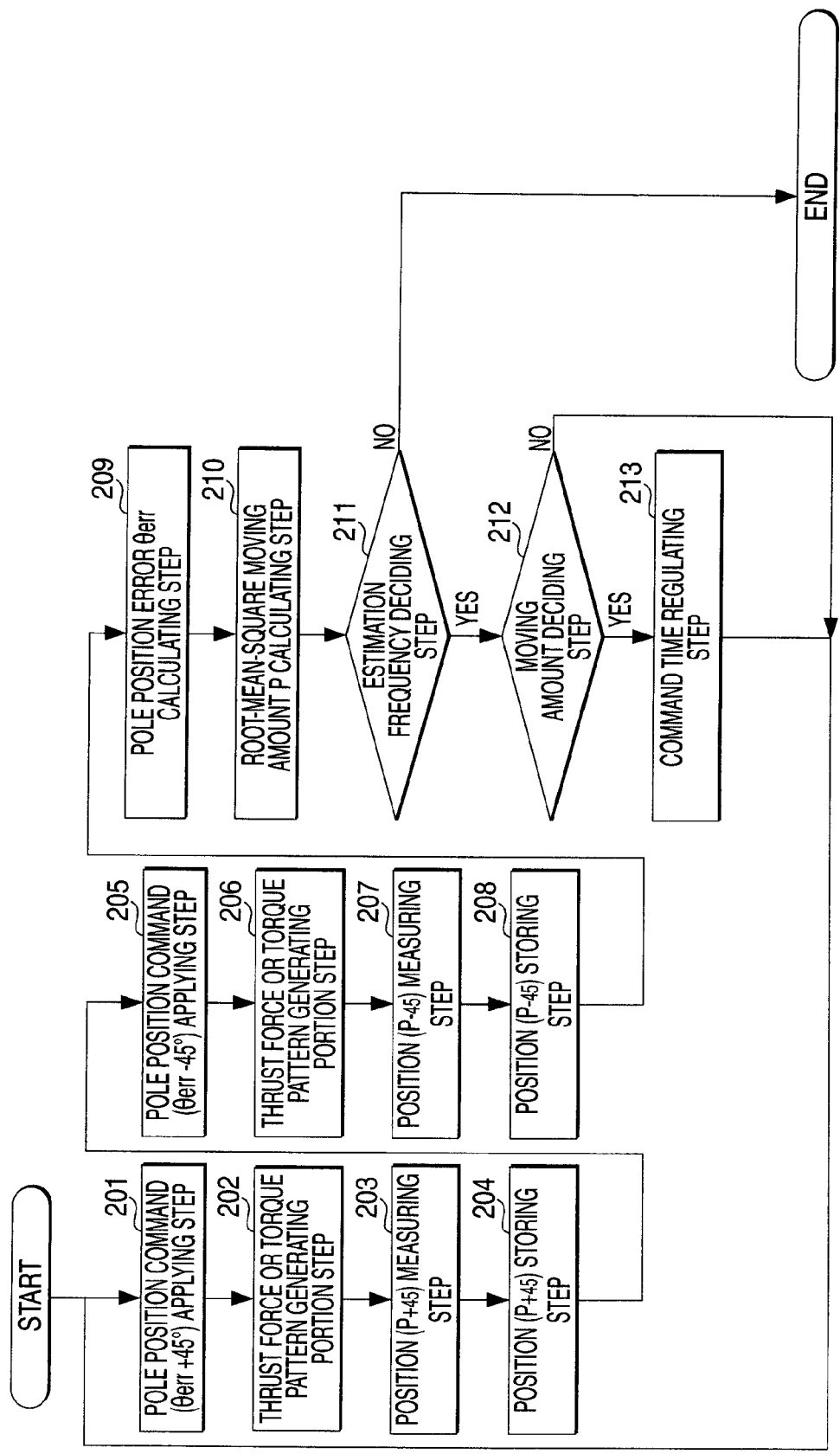
FIG. 3 is a flowchart showing an initial pole position estimating method according to an example 2 of the invention.

FIG. 3 is a flowchart showing an initial pole position estimating method according to an example 2 of the invention. In FIG. 2, it is indicated that a command time of a command thrust force or torque is regulated using two types of test angles ($\theta_{err}+45°$) and ($\theta_{err}-45°$) as pole position commands. In the drawing, 201 denotes a pole position command ($\theta_{err}+45°$) applying step, 202 and 206 denote a thrust force or torque pattern generating portion step, 203 denotes a position ($P_{+45}$) measuring step, 204 denotes a position ($P_{+45}$) storing step, 205 denotes a pole position command ($\theta_{err}-45°$) applying step, 207 denotes a position ($P_{-45}$) measuring step, 208 denotes a position ($P_{-45}$) storing step, 209 denotes a pole position error $\theta_{err}$ calculating step, 210 denotes a root-mean-square moving amount P calculating step, 211 denotes an estimation frequency deciding step, 212 denotes a moving amount deciding step, and 213 denotes a command time regulating step.

First of all, the pole position command ($\theta_{err}+45°$) is applied at the pole position command ($\theta_{err}+45°$) applying step 201, and a thrust force or torque pattern is generated using a command thrust force or torque and a command time at the thrust force or torque pattern generating portion step 202. Then, a position ($P_{+45}$) is measured at the position ($P_{+45}$) measuring step 203, and the position ($P_{+45}$) measured in the position storing device is stored at the position ($P_{+45}$) storing step 204.

Next, the pole position command ($\theta_{err}-45°$) is applied at the pole position command ($\theta_{err}-45°$) applying step 205, and a thrust force or torque pattern is generated using a command thrust force or torque and a command time at the thrust force or torque pattern generating portion step 206. Then, a position ($P_{-45}$) is measured at the position ($P_{-45}$) measuring step 207, and the position ($P_{-45}$) measured in the position storing device is stored at the position ($P_{-45}$) storing step 208.

Then, an error angle $\theta_{err}$ is calculated using the position ($P_{+45}$) and the position ($P_{-45}$) stored in the position storing device at the pole position error $\theta_{err}$ calculating step 209. A root-mean-square moving amount (P) is obtained at the root-mean-square moving amount P calculating step 210, and it is checked whether a first estimating calculation is carried out or not at the estimation frequency deciding step 211, a position ($P_{save}$) stored in the position storing device is compared with a position set value ($P_{set}$) at the moving amount deciding step 212 if the first estimating calculation is carried out. Then, a command time correction value $T_{cmp}$ is obtained and added to a command time $T_{com}$ to regulate the command time ($T_{com}=T_{com}+T_{cmp}$) at the command time regulating step 213 if the position ($P_{save}$) is smaller than the position set value ($P_{set}$), and then the processing is repeated from the pole position command ($\theta_{err}+45°$) applying step 201 again. The position storing device indicates a memory such as the first position storing portion 51 and the second position storing portion 52 in FIG. 1, and the position ($P_{save}$) is the calculated root-mean-square moving amount (P) which is stored in the memory, and the position set value ($P_{set}$) represents a root-mean-square position reference set value which is set in advance.

The position ($P_{save}$) stored in the position storing device is compared with the position set value ($P_{set}$) at the moving amount deciding step 212. If the position ($P_{save}$) is not smaller than the position set value ($P_{set}$), the command time is not corrected but the processing is repeated from the pole position command ($\theta_{err}+45°$) applying step 201 again. More specifically, if an estimation frequency is equal to or greater than two at the estimation frequency deciding step 211, the processing is to be ended. At a first estimation, precision in the estimation of the error angle $\theta_{err}$ is not high. Therefore, the error angle $\theta_{err}$ and the moving amount P are regulated and the estimation is then repeated again to enhance the precision.

Figure 7:
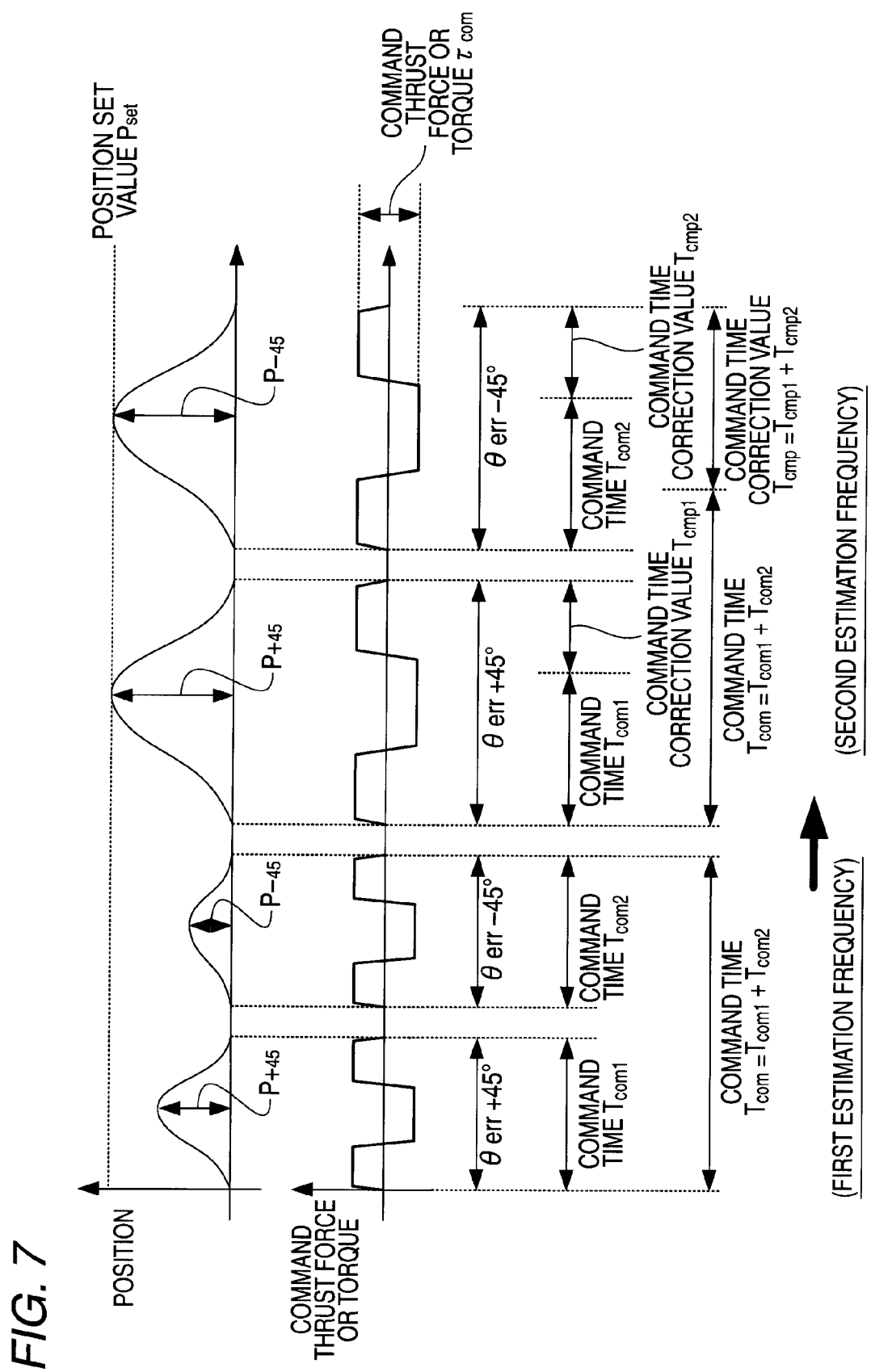
FIG. 7 is a chart showing a regulation of a command time according to the example 2 of the invention.
Figure 8:
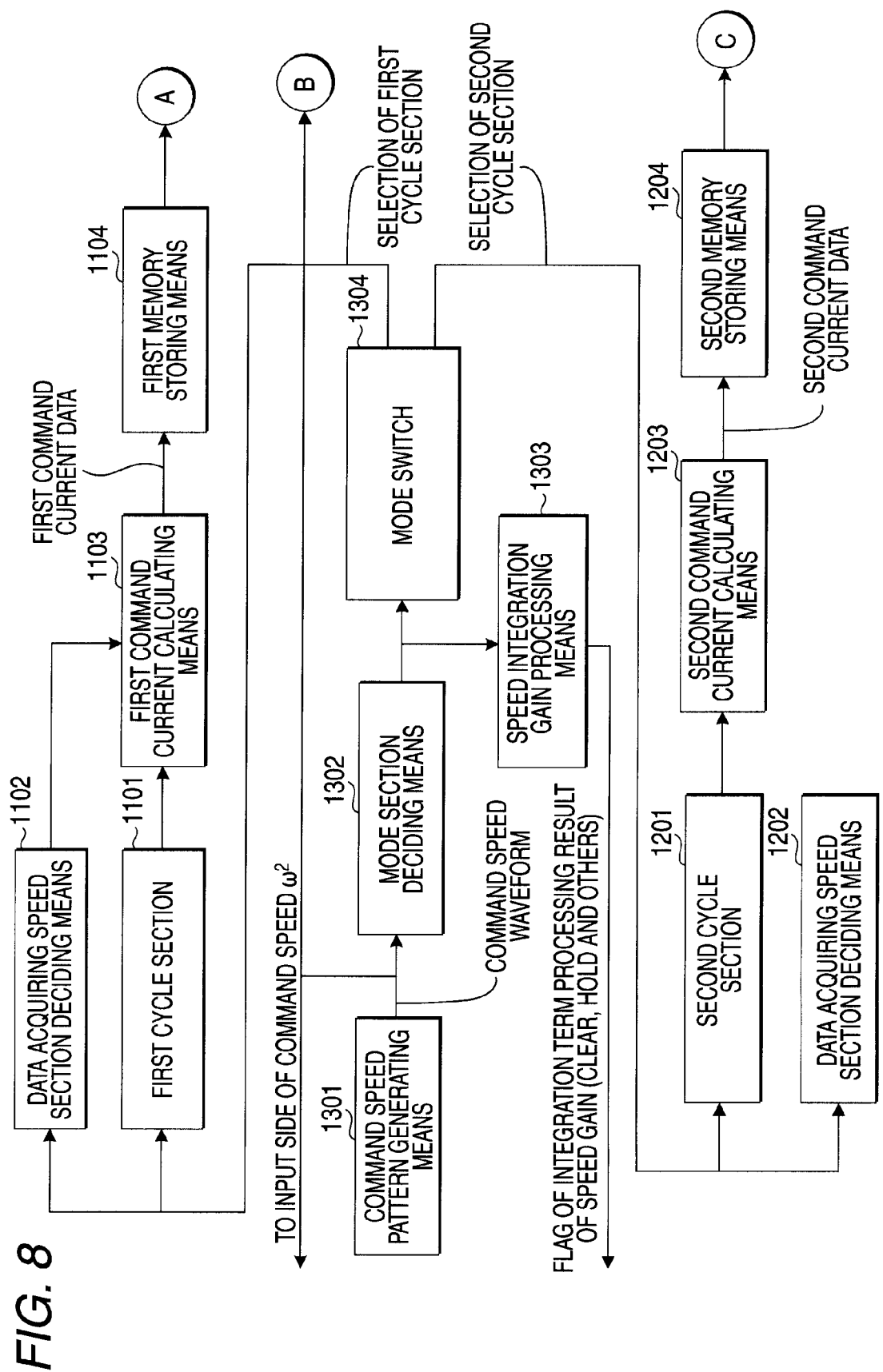
FIG. 8 is a diagram showing a conventional initial pole position estimating apparatus and method for an AC synchronous motor.

FIG. 7 is a chart showing the regulation of the command time according to the example 2 of the invention. In the drawing, it is indicated that the pole position is corrected after the first estimation frequency and the command time correction value is added to the command time to regulate the thrust force or torque pattern and to apply the regulated thrust force or torque pattern to the AC synchronous motor. Thus, the positions ($P_{+45}$) and ($P_{-45}$) of the AC synchronous motor can be thus adapted to the position set value ($P_{set}$) irrespective of a load state such as a friction of a guide mechanism. More specifically, when the position ($P_{+45}$) or ($P_{-45}$) is smaller than the position set value ($P_{set}$), it is preferable to prolong the command time and the command time correction value $T_{cmp}$ is obtained from the command time $T_{com}$ and Equation (5), and the command time $T_{com}$ is thus corrected.

$$T_{cmp} = \sqrt{\frac{P_{set} - P_{save}}{P_{save}}} \times T_{com} \qquad (5)$$

By correcting the time that the thrust force or torque command is generated, thus, it is possible to cause the position ($P_{+45}$) or ($P_{-45}$) to be coincident with the position set value ($P_{set}$) and to estimate the pole position in a short time while maintaining precision in the estimation.

In the invention, there is carried out the open loop control of the position through the torque. In some cases, therefore, an original position is not returned in the thrust force or torque pattern. In these cases, in the thrust force or torque pattern correcting portion 9 in FIG. 1, it is possible to return a current position to the initial magnetic pole estimation starting position by calculating the thrust force or torque amplitude correction value $\tau_{cmp}$ to correct the command thrust force or torque $\tau_{com}$ with Equation (6) after the position ($P_{+45}$) storing step 104 and the position ($P_{-45}$) storing step 108 in FIG. 2 or the position ($P_{+45}$) storing step 204 and the position ($P_{-45}$) storing step 208 in FIG. 3. (P) represents the root-mean-square moving amount calculated at the root-mean-square moving amount P calculating step 110 in FIG. 2 or the root-mean-square moving amount P calculating step 210 in FIG. 3, and ($P_{max}$) represents a maximum value of the root-mean-square moving amount and a represents a set value.

$$\tau_{cmp} = \tau_{com} \times \frac{P_{max} - P}{P} \times \alpha \qquad (6)$$

While the description has been given to the individual correction of the thrust force or torque pattern through the calculation of the amplitude value of the thrust force or torque pattern in the example 1 or the calculation of the correction value of the thrust force or torque pattern command time in the example 2, it is also possible to finally correct the thrust force or torque pattern by limiting the correction amount of the amplitude value in the example 1 if it is large and then calculating the correction value of the command time as in the example 2.

INDUSTRIAL APPLICABILITY

The invention relates to an initial pole position estimating apparatus and method for an AC synchronous motor, which serves to estimate an initial pole position of the AC synchronous motor without using a magnetic pole detector (a pole sensor), in a permanent magnet type AC synchronous motor including a linear motor and a rotating machine. In the initial pole position estimating apparatus and method, a fluctuation in a load is detected during the estimation of the initial pole position and an amplitude value or a command time of a thrust force or torque pattern is corrected based on the value thus detected. Therefore, the invention can be utilized in various fields such as a machine tool, a mounting machine, a semiconductor, liquid crystal manufacturing apparatus or a conveyer, which have mechanism systems to be driven by a permanent magnetic type AC synchronous motor which does not have a magnetic pole detector (a pole sensor) such as a linear motor or a rotating machine. Further, the invention can be utilized in various guide mechanisms such as a linear guide and an air bearing.

The invention claimed is:

1. An initial magnetic pole estimating apparatus for an AC synchronous motor without using a magnetic pole detector, the initial magnetic pole estimating apparatus comprising:
   a thrust force or torque pattern generating portion for generating a thrust force or torque pattern;
   a pole position command generating portion for generating a pole position command;
   a position detecting portion for detecting a position of the AC synchronous motor;
   a pole position correcting portion for correcting the pole position command; and
   a thrust force or torque pattern correcting portion for correcting the thrust force or torque pattern,
   wherein the pole position command and the thrust force or torque pattern are corrected repetitively to estimate an initial pole position.

2. The initial magnetic pole estimating apparatus of claim 1, wherein the pole position correcting portion corrects the pole position command based on an error angle calculated in an error angle calculating portion.

3. The initial magnetic pole estimating apparatus of claim 2, wherein the error angle calculating portion calculates the error angle based on two detected positions stored respectively when the AC synchronous motor is operated in accordance with the two pole position commands for pole positions of ±45 degrees.

4. The initial magnetic pole estimating apparatus of claim 1, wherein the thrust force or torque pattern correcting portion corrects the thrust force or torque pattern based on a root-mean-square moving amount calculated in a root-mean-square moving amount calculating portion.

5. The initial magnetic pole estimating apparatus of claim 4, wherein the root-mean-square moving amount calculating portion calculates the root-mean-square moving amount based on two detected positions stored respectively when the AC synchronous motor is operated in accordance with the two pole position commands for pole positions of ±45 degrees.

6. The initial magnetic pole estimating apparatus of claim 4, wherein an amplitude value of the thrust force or torque pattern or a correction value of a command time is calculated only when the root-mean-square moving amount is smaller than a root-mean-square position reference set value which is previously set, and then the thrust force or torque pattern is corrected.

7. The initial magnetic pole estimating apparatus of claim 1 or 4, wherein the thrust force or torque pattern correcting portion returns a current position to an initial magnetic pole estimation starting position based on a maximum value of the root-mean-square moving amount and the position detected in the position detecting portion.

8. The initial magnetic pole estimating apparatus of claim 1, wherein the correction of the thrust force or torque pattern in the thrust force or torque pattern correcting portion is a correction of an amplitude value of the thrust force or torque pattern.

9. The initial magnetic pole estimating apparatus of claim 1, wherein the correction of the thrust force or torque pattern in the thrust force or torque pattern correcting portion is a correction of a command time of the thrust force or torque pattern.

10. The initial magnetic pole estimating apparatus of claim 1, wherein the AC synchronous motor is a rotating motor or a linear motor.

11. The initial magnetic pole estimating apparatus of claim 1, wherein the thrust force or torque pattern generated by the thrust force or torque pattern generating portion has any thrust force or torque pattern waveform.

12. An initial magnetic pole estimating method for an AC synchronous motor without using a magnetic pole detector, the initial magnetic pole estimating method comprising:
   generating a thrust force or torque pattern;
   generating a pole position command;
   detecting a position of the AC synchronous motor;
   correcting the pole position command; and
   correcting the thrust force or torque pattern; and
   correcting the pole position command and the thrust force or torque pattern repetitively to estimate an initial pole position.

13. The initial magnetic pole estimating method of claim 12, further comprising:
   storing a position detected in accordance with the pole position command for a pole position of +45 degrees;
   storing a position detected in accordance with the pole position command for a pole position of −45 degrees;
   calculating an error angle and a root-mean-square moving amount based on the two detected positions which are stored;
   correcting the pole position command based on the error angle; and
   correcting the thrust force or torque pattern based on the root-mean-square moving amount.

* * * * *